United States Patent
Zhang et al.

(10) Patent No.: US 11,075,880 B2
(45) Date of Patent: Jul. 27, 2021

(54) DATA SERVICE IMPLEMENTATION METHOD AND APPARATUS, AND TERMINAL

(71) Applicant: HUAWEI TECHNOLOGIES CO., LTD., Guangdong (CN)

(72) Inventors: Xiuping Zhang, Dongguan (CN); Te-Chin Chang, Taipei (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/608,647

(22) PCT Filed: Feb. 12, 2018

(86) PCT No.: PCT/CN2018/076585
§ 371 (c)(1),
(2) Date: Oct. 25, 2019

(87) PCT Pub. No.: WO2018/196468
PCT Pub. Date: Nov. 1, 2018

(65) Prior Publication Data
US 2020/0145370 A1    May 7, 2020

(30) Foreign Application Priority Data
Apr. 27, 2017  (CN) .......................... 201710288884.9

(51) Int. Cl.
*G06F 15/16* (2006.01)
*H04L 29/12* (2006.01)
(Continued)

(52) U.S. Cl.
CPC ...... *H04L 61/2076* (2013.01); *H04L 61/1511* (2013.01); *H04L 61/2015* (2013.01);
(Continued)

(58) Field of Classification Search
CPC ........... H04L 61/6068; H04L 29/12933; H04L 41/0873
See application file for complete search history.

(56) References Cited

U.S. PATENT DOCUMENTS

| | | | |
|---|---|---|---|
| 7,200,678 B1 * | 4/2007 | Bettadahalli | ........ H04L 61/2015 370/401 |
| 7,356,011 B1 | 4/2008 | Waters et al. | |

(Continued)

FOREIGN PATENT DOCUMENTS

| | | |
|---|---|---|
| CN | 102196499 A | 9/2011 |
| CN | 102202104 A | 9/2011 |

(Continued)

OTHER PUBLICATIONS

Office Action issued in Chinese Application No. 201880002514.7 dated Jan. 3, 2020, 10 pages (with English ranslation).

(Continued)

*Primary Examiner* — Umar Cheema
*Assistant Examiner* — Tesfu N Mekonen
(74) *Attorney, Agent, or Firm* — Fish & Richardson P.C.

(57) ABSTRACT

This application provides a data service method relates to the field of communications technologies, the method comprises: a first router is connected to a second router, and the first router establishes a connection to the Internet. The terminal establishes a wireless local area network connection to the second router. A terminal broadcasts request information for obtaining a network configuration parameter. The terminal receives and stores a first network configuration parameter and a second network configuration parameter respectively sent by the first router and the second router; and determines a network configuration parameter used for network configuration. The second router receives a second data service request sent by the terminal, and forwards the request to the first router, so that the first router (Continued)

sends the request to a server through the Internet, thereby implementing a second data service of the terminal.

13 Claims, 11 Drawing Sheets

(51) Int. Cl.
*H04L 29/08* (2006.01)
*H04L 29/06* (2006.01)
*H04W 40/24* (2009.01)
*H04W 88/16* (2009.01)
*H04W 84/12* (2009.01)

(52) U.S. Cl.
CPC ............ *H04L 67/02* (2013.01); *H04L 69/163* (2013.01); *H04W 40/248* (2013.01); *H04W 88/16* (2013.01); *H04W 84/12* (2013.01)

(56) References Cited

U.S. PATENT DOCUMENTS

| | | | |
|---|---|---|---|
| 7,953,830 B2 | 5/2011 | Foster et al. | |
| 9,413,610 B2 | 8/2016 | Moore | |
| 2005/0152287 A1* | 7/2005 | Yokomitsu | H04L 29/12009 370/255 |
| 2009/0006635 A1* | 1/2009 | Siegmund | H04L 61/103 709/228 |
| 2010/0191839 A1* | 7/2010 | Gandhewar | H04L 61/2015 709/220 |
| 2011/0238793 A1* | 9/2011 | Bedare | H04L 45/586 709/220 |
| 2013/0113539 A1 | 5/2013 | Carragher et al. | |
| 2014/0022942 A1 | 1/2014 | Han et al. | |
| 2014/0068720 A1* | 3/2014 | Somers | H04L 63/1441 726/4 |
| 2014/0241271 A1 | 8/2014 | Jung et al. | |
| 2014/0259147 A1* | 9/2014 | L'Heureux | H04L 63/083 726/14 |
| 2015/0163656 A1* | 6/2015 | Son | H04L 61/2521 370/338 |
| 2015/0281172 A1 | 10/2015 | He et al. | |
| 2015/0365376 A1 | 12/2015 | Kang et al. | |
| 2016/0156673 A1 | 6/2016 | Emmanuel et al. | |

FOREIGN PATENT DOCUMENTS

| | | |
|---|---|---|
| CN | 102413203 A | 4/2012 |
| CN | 102801563 A | 11/2012 |
| CN | 102869059 A | 1/2013 |
| CN | 103139023 A | 6/2013 |
| CN | 103368847 A | 10/2013 |
| CN | 104488222 A | 4/2015 |
| CN | 105847464 A | 8/2016 |
| CN | 106254407 A | 12/2016 |

OTHER PUBLICATIONS

PCT International Search Report and Written Opinion issued in International Application No. PCT/CN2018/076585 on May 2, 2018, 15 pages (with English translation).

PCT International Search Report and Written Opinion issued in International Application No. PCT/CN2017/087756 dated Nov. 1, 2017, 12 pages.

Chen et al., "A Seamless Handoff Mechanism for DHCP-Based IEEE 802.11 WLANs," IEEE Communications Letters, vol. 11, No. 8, Aug. 2007, 3 pages.

Extended European Search Report issued in European Application No. 18792217.4 dated Mar. 5, 2020, 15 pages.

* cited by examiner ically, with popularization of a local area network such as a home network and a company network, using the company network as an example, a plurality of routers may be disposed in an office to resolve a problem that a user cannot implement a data service because a coverage area of the local area network is limited and a Wi-Fi signal is weakened by an obstacle such as a wall. In the plurality of routers, at least one router is connected to the Internet, and one or more other routers may be connected to the at least one router in a wired or wireless manner. In this way, the user can access any one of the routers by using a mobile phone, to implement the data service.

DATA SERVICE IMPLEMENTATION METHOD AND APPARATUS, AND TERMINAL

CROSS-REFERENCE TO RELATED APPLICATIONS

This application is a national stage of International Application No. PCT/CN2018/076585, filed on Feb. 12, 2018, which claims priority to Chinese Patent Application No. 201710288884.9, filed on Apr. 27, 2017. Both of the aforementioned applications are hereby incorporated by reference in their entireties.

TECHNICAL FIELD

This application relates to the field of communications technologies, and in particular, to a data service implementation method and apparatus, and a terminal.

BACKGROUND

With development of communications technologies, especially, with popularization of a local area network such as a home network and a company network, using the company network as an example, a plurality of routers may be disposed in an office to resolve a problem that a user cannot implement a data service because a coverage area of the local area network is limited and a Wi-Fi signal is weakened by an obstacle such as a wall. In the plurality of routers, at least one router is connected to the Internet, and one or more other routers may be connected to the at least one router in a wired or wireless manner. In this way, the user can access any one of the routers by using a mobile phone, to implement the data service.

Before implementing the data service, the mobile phone obtains a network configuration parameter from a network side by using a router disposed in the local area network. After the mobile phone sends a request for obtaining a network configuration parameter, all the plurality of routers in the local area network may send a network configuration parameter to the mobile phone after receiving the request. The mobile phone uses a first-received network configuration parameter to perform network configuration, and may discard one or more other received network configuration parameters. However, in the local area network, when the network configuration parameter that is first received by the mobile phone is a network configuration parameter sent by the one or more other routers, because the one or more other routers are connected to the Internet by using the at least one router, the mobile phone cannot implement the data service after the mobile phone completes network configuration.

SUMMARY

Embodiments of this application provide a data service implementation method and apparatus, and a terminal, so as to resolve a problem that a mobile phone cannot implement a data service in a local area network.

To achieve the foregoing objective, the embodiments of this application use the following technical solutions:

According to a first aspect, an embodiment of this application provides a data service implementation method. The method is implemented in a communications system. The communications system includes a terminal, a first router, and a second router. The first router is connected to the second router in a wireless or wired manner, and the first router establishes a connection to the Internet. The method includes: establishing, by the terminal, a wireless local area network connection to the second router; broadcasting, by the terminal according to a short-range communication protocol, a Dynamic Host Configuration Protocol discover DHCP DISCOVER message that carries identification information of the terminal; receiving, by the second router, the DHCP DISCOVER message; sending, by the second router, a second Dynamic Host Configuration Protocol offer DHCP OFFER message to the terminal in response to the DHCP DISCOVER message; receiving and storing, by the terminal, the second DHCP OFFER message, where the second DHCP OFFER message includes a second Internet Protocol IP address and a second gateway address that are allocated by the second router to the terminal; sending, by the first router, a first DHCP OFFER message to the terminal in response to the DHCP DISCOVER message; receiving and storing, by the terminal, the first DHCP OFFER message, where the first DHCP OFFER message includes a first IP address and a first gateway address that are allocated by the first router to the terminal; determining, by the terminal, whether the second router is the same as a stored historical gateway record; when the terminal determines that the second router is the same as the stored historical gateway record, detecting, by the terminal, whether a domain name system DNS failure or a Transmission Control Protocol TCP Rx failure occurs; sending, by the terminal, an HTTP GET message to the second router when the terminal detects the DNS failure or the TCP Rx failure, or when the terminal determines that the second router is different from the stored historical gateway record; determining, by the terminal, whether a feedback message sent by the second router is received, where the feedback message is a message sent by the second router to the terminal in response to the HTTP GET message sent by the terminal; and when the terminal does not receive the feedback message sent by the second router, performing, by the terminal, network configuration by using a first network configuration parameter carried in the first DHCP OFFER message, so as to implement a data service by using a first gateway. According to the foregoing technical solutions, the terminal may flexibly perform network configuration based on different network configuration parameters, and finally implement the data service, thereby improving efficiency of performing the data service by the terminal, and improving user experience of Internet access.

According to a second aspect, an embodiment of this application provides a data service implementation method. The method is implemented in a communications system. The communications system includes a terminal, a first router, and a second router. The first router is connected to the second router in a wireless or wired manner, and the first router establishes a connection to the Internet. The method includes: establishing, by the terminal, a wireless local area network connection to the second router; broadcasting, by the terminal according to a short-range communication protocol, request information for obtaining a network configuration parameter; receiving, by the terminal, a first network configuration parameter sent by the first router and a second network configuration parameter sent by the second router, and storing, by the terminal, the first network configuration parameter and the second network configuration parameter; determining, by the terminal in the first network configuration parameter and the second network configuration parameter, a network configuration parameter used for network configuration, and implementing network configuration based on the determined network configuration parameter; sending, by the terminal, a second data service request to the second router; receiving, by the second router, the second data service request, and forwarding the request to the first router based on a gateway address in the second data service request; and sending, by the first router, the second data service request to a server through the Internet, so as to implement a second data service of the terminal. It can be learned that, because the terminal stores received network configuration parameters fed back by all routers, after the terminal performs network configuration by using a network configuration parameter sent by one router, when the terminal cannot implement a data service, the terminal may obtain, from the stored network configuration parameters, a network configuration parameter that has not been used for network configuration, to perform network configuration, so as to implement the data service of the terminal.

In an example implementation, the determining, by the terminal in the first network configuration parameter and the second network configuration parameter, a network configuration parameter used for network configuration, and implementing network configuration based on the determined network configuration parameter may be implemented as follows: The terminal determines whether the first router is the same as a stored historical gateway record; and when the first router is the same as the stored historical gateway record, and the terminal does not detect at least one of a domain name system DNS failure and a Transmission Control Protocol TCP Rx failure, the terminal performs network configuration by using the first network configuration parameter. It can be learned that the terminal may screen the received network configuration parameters with reference to the stored historical gateway record and whether the DNS failure and the TCP Rx failure occur. When the first router is the same as the stored historical gateway record, it indicates that the terminal previously implemented the data service by using the first router. On this basis, the terminal does not detect at least one of the domain name system DNS failure and the Transmission Control Protocol TCP Rx failure, and it indicates that the terminal can implement the data service by using the first router. Therefore, the terminal may perform network configuration by using the first network configuration parameter.

In an example implementation, when the first router is the same as the stored historical gateway record, and the terminal detects the DNS failure or the TCP Rx failure, the terminal sends an HTTP GET message to the first router. The DNS failure or the TCP Rx failure indicates that a message sent by the terminal to a network side may not have a feedback. Therefore, to further determine whether the first router enables the terminal to implement the data service, the terminal may send the HTTP GET message to the first router, to check a network.

In an example implementation, when the first router is different from the stored historical gateway record, the terminal sends the HTTP GET message to the first router. When the first router is different from the stored historical gateway record, it indicates that the terminal has not used the first router as a gateway to implement the data service. Therefore, the terminal may send the HTTP GET message to the first router, to check a network.

In an example implementation, when the terminal receives a feedback message sent by the first router in response to the HTTP GET message, the terminal performs network configuration by using the first network configuration parameter. When the terminal receives the feedback message, the terminal may determine the first router as the gateway, so that the terminal implements the data service. Therefore, the terminal may perform network configuration by using the first network configuration parameter.

In an example implementation, when the terminal does not receive the feedback message sent by the first router in response to the HTTP GET message, the terminal performs network configuration by using the second network configuration parameter. When the terminal does not receive the feedback message, the terminal cannot implement the data service by determining the first router as the gateway. Therefore, the terminal may perform network configuration by using the second network configuration parameter.

In an example implementation, the first network configuration parameter includes a first Internet Protocol IP address and a first gateway address that are carried in a first DHCP OFFER message sent by the first router to the terminal; and the second network configuration parameter includes a second IP address and a second gateway address that are carried in a second DHCP OFFER message sent by the second router to the terminal.

According to a third aspect, an embodiment of this application provides a data service implementation method. The method is implemented in a communications system. The communications system includes a terminal, a first router, and a second router. The first router is connected to the second router in a wireless or wired manner, and the first router establishes a connection to the Internet. The method includes: establishing, by the terminal, a wireless local area network connection to the second router; broadcasting, by the terminal according to a short-range communication protocol, request information for obtaining a network configuration parameter; receiving, by the terminal, a first network configuration parameter sent by the first router and a second network configuration parameter sent by the second router, and storing, by the terminal, the first network configuration parameter and the second network configuration parameter; when the terminal determines that a data service of the terminal cannot be implemented through a wireless local area network provided by the second router for the terminal, obtaining, by the terminal, the first network configuration parameter; sending, by the terminal, an HTTP GET message to the first router that sends the first network configuration parameter; and when the terminal receives a first feedback message sent by the first router, implementing, by the terminal, network configuration based on the first network configuration parameter, where the first feedback message is a message sent by the first router to the terminal in response to the HTTP GET message sent by the terminal.

In an example implementation, after the terminal receives and stores the second network configuration parameter sent by the second router, the terminal determines whether the second router is the same as a stored historical gateway record. When the second router is the same as the stored historical gateway record, and the terminal detects at least one of a domain name system DNS failure and a Transmission Control Protocol TCP Rx failure, the terminal sends the HTTP GET message; or when the second router is different from the stored historical gateway record, the terminal sends the HTTP GET message.

In an example implementation, the determining, by the terminal, that a data service of the terminal cannot be implemented through a wireless local area network provided by the second router for the terminal may be implemented as follows: When the terminal does not receive a second feedback message sent by the second router in response to the HTTP GET message, the terminal determines that the data service of the terminal cannot be implemented through the wireless local area network provided by the second router for the terminal. The second feedback message is a message sent by the second router to the terminal in response to the HTTP GET message sent by the terminal.

In an example implementation, the first network configuration parameter includes a first Internet Protocol IP address and a first gateway address that are carried in a first DHCP OFFER message sent by the first router to the terminal; and the second network configuration parameter includes a second IP address and a second gateway address that are carried in a second DHCP OFFER message sent by the second router to the terminal.

According to a fourth aspect, an embodiment of the present invention provides a data service implementation apparatus. The apparatus may implement functions implemented in the foregoing method embodiment. The functions may be implemented by hardware, or may be implemented by hardware executing software in any one of the first aspect and various example implementations of the first aspect. The hardware or the software includes one or more modules corresponding to the functions.

According to a fifth aspect, an embodiment of the present invention provides a data service implementation apparatus. The apparatus may implement functions implemented in the foregoing method embodiment. The functions may be implemented by hardware, or may be implemented by hardware executing software in any one of the second aspect and various example implementations of the second aspect. The hardware or the software includes one or more modules corresponding to the functions.

According to a sixth aspect, an embodiment of the present invention provides a data service implementation apparatus. The apparatus may implement functions implemented in the foregoing method embodiment. The functions may be implemented by hardware, or may be implemented by hardware executing software in any one of the third aspect and various example implementations of the third aspect. The hardware or the software includes one or more modules corresponding to the functions.

According to a seventh aspect, an embodiment of the present invention provides a terminal. A structure of the terminal includes a display screen, a memory, one or more processors, a plurality of application programs, and one or more programs. The one or more programs are stored in the memory. When the one or more processors execute the one or more programs, the terminal is enabled to implement the method according to any one of the first aspect and various example implementations of the first aspect.

According to an eighth aspect, an embodiment of the present invention provides a terminal. A structure of the terminal includes a display screen, a memory, one or more processors, a plurality of application programs, and one or more programs. The one or more programs are stored in the memory. When the one or more processors execute the one or more programs, the terminal is enabled to implement the method according to any one of the second aspect and various example implementations of the second aspect.

According to a ninth aspect, an embodiment of the present invention provides a terminal. A structure of the terminal includes a display screen, a memory, one or more processors, a plurality of application programs, and one or more programs. The one or more programs are stored in the memory. When the one or more processors execute the one or more programs, the terminal is enabled to implement the method according to any one of the third aspect and various example implementations of the third aspect.

According to a tenth aspect, an embodiment of the present invention provides a readable storage medium, including an instruction. When the instruction is run on a terminal, the terminal is enabled to perform the method according to any one of the first aspect and various example implementations of the first aspect.

According to an eleventh aspect, an embodiment of the present invention provides a readable storage medium, including an instruction. When the instruction is run on a terminal, the terminal is enabled to perform the method according to any one of the first aspect and various example implementations of the first aspect.

According to a twelfth aspect, an embodiment of the present invention provides a readable storage medium, including an instruction. When the instruction is run on a terminal, the terminal is enabled to perform the method according to any one of the first aspect and various example implementations of the first aspect.

According to a thirteenth aspect, an embodiment of the present invention provides a computer program product. The computer program product includes software code, and the software code is used to perform the method according to any one of the first aspect and various example implementations of the first aspect.

According to a fourteenth aspect, an embodiment of the present invention provides a computer program product. The computer program product includes software code, and the software code is used to perform the method according to any one of the first aspect and various example implementations of the first aspect.

According to a fifteenth aspect, an embodiment of the present invention provides a computer program product. The computer program product includes software code, and the software code is used to perform the method according to any one of the first aspect and various example implementations of the first aspect.

BRIEF DESCRIPTION OF DRAWINGS

FIG. 5($b$) is a flowchart of a network diagnosis method according to an embodiment of this application;

FIG. 6($b$) is a schematic diagram of a second mobile phone display interface according to an embodiment of this application;

FIG. 6($c$) is a schematic diagram of a third mobile phone display interface according to an embodiment of this application;

FIG. 6($d$) is a schematic diagram of a fourth mobile phone display interface according to an embodiment of this application;

DESCRIPTION OF EMBODIMENTS

Figure 1:
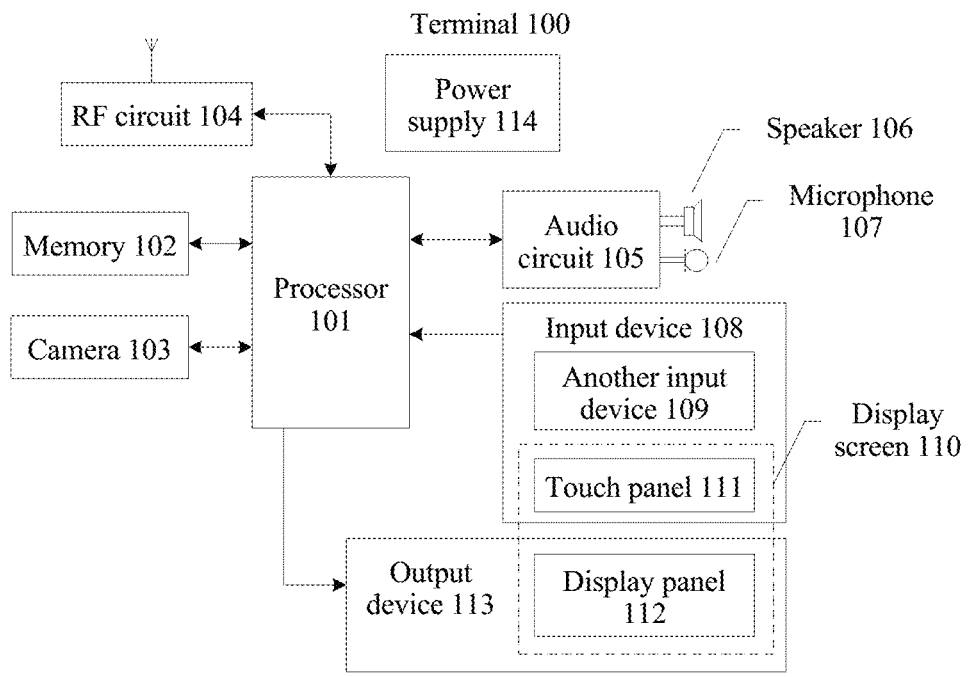
FIG. 1 is a schematic structural diagram of a first terminal according to an embodiment of this application.

The embodiments of this application may be applied to a terminal, and the terminal may include a device such as a notebook computer, a smartphone, a virtual reality (Virtual Reality, VR) device, an augmented reality (Augmented Reality, AR) technology, an in-vehicle device, or an intelligent wearable device. The terminal may be provided with at least a display screen, an input device, and a processor. A terminal 100 is used as an example. As shown in FIG. 1, the terminal 100 includes components such as a processor 101, a memory 102, a camera 103, an RF circuit 104, an audio circuit 105, a speaker 106, a microphone 107, an input device 108, another input device 109, a display screen 110, a touch panel 111, a display panel 112, an output device 113, and a power supply 114. The display screen 110 includes at least the touch panel 111 serving as an input device and the display panel 112 serving as an output device. It should be noted that a structure of the terminal shown in FIG. 1 constitutes no limitation on the terminal, and the terminal may include more or fewer components than those shown in the figure, or combine some components, or split some components, or have different component arrangements. This is not limited herein.

The following describes each constituent component of the terminal 100 in detail with reference to FIG. 1.

The radio frequency (Radio Frequency, RF) circuit 104 may be configured to: receive and send information or receive and send a signal during a call. For example, if the terminal 100 is a mobile phone, the terminal 100 may send, by using the RF circuit 104 after receiving downlink information sent by a base station, the downlink information to the processor 101 for processing; and send related uplink data to the base station. The RF circuit usually includes but is not limited to an antenna, at least one amplifier, a transceiver, a coupler, a low noise amplifier (Low Noise Amplifier, LNA), and a duplexer. In addition, the RF circuit 104 may further communicate with a network and another device through wireless communication. The wireless communication may use any communication standard or protocol, including but not limited to Global System for Mobile Communications (Global System for Mobile communications, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short message service (Short Message Service, SMS), and the like.

The memory 102 may be configured to store a software program and a module. The processor 101 performs various function applications of the terminal 100 and data processing by running the software program and the module stored in the memory 102. The memory 102 may mainly include a program storage area and a data storage area. The program storage area may store an operating system, an application required by at least one function (for example, a sound playing function or an image playing function), and the like. The data storage area may store data (for example, audio data or video data) created when the terminal 100 is used, and the like. In addition, the memory 102 may include a high-speed random access memory, or may include a non-volatile memory such as at least one magnetic disk storage device, a flash memory, or another volatile solid-state storage device.

The another input device 109 may be configured to: receive entered digital or character information, and generate key signal input related to user settings and function control of the terminal 100. Specifically, the another input device 109 may include but is not limited to one or more of a physical keyboard, a function key (such as a volume control key or an on/off key), a trackball, a mouse, a joystick, an optical mouse (the optical mouse is a touch-sensitive surface that does not display visual output, or an extension of a touch-sensitive surface formed by a touchscreen), and the like. The another input device 109 may further include a sensor built in the terminal 100, such as a gravity sensor or an acceleration sensor, and the terminal 100 may further use a parameter detected by the sensor as input data.

The display screen 110 may be configured to display information entered by a user or information provided for a user, and various menus of the terminal 100, and may further receive user input. In addition, the display panel 112 may be configured in a form of a liquid crystal display (Liquid Crystal Display, LCD), an organic light-emitting diode (Organic Light-Emitting Diode, OLED), or the like. The touch panel 111, also referred to as a touchscreen, a touch-sensitive screen, or the like, may collect a touch or non-touch operation (for example, an operation performed by the user on the touch panel 111 or near the touch panel 111 by using any proper object or accessory, such as a finger or a stylus, or may include a motion sensing operation, where the operation includes an operation type such as a single-point control operation or a multipoint control operation) performed by the user on or near the touch panel, and drive a corresponding connection apparatus based on a preset program. It should be noted that the touch panel 111 may further include two parts: a touch detection apparatus and a touch controller. The touch detection apparatus detects a touch orientation and gesture of the user, detects a signal brought by a touch operation, and sends the signal to the touch controller. The touch controller receives touch information from the touch detection apparatus, converts the touch information into information that can be processed by the processor 101, and then transmits the information to the processor 101. In addition, the touch controller can further receive and execute a command sent by the processor 101. In addition, the touch panel 111 may be implemented as resistive, capacitive, infrared, surface acoustic wave, or other types of touch panels, or the touch panel 111 may be implemented by using any technology developed in the future. Generally, the touch panel 111 may cover the display panel 112. The user may perform, based on content displayed on the display panel 112 (the displayed content includes but is not limited to a soft keyboard, a virtual mouse, a virtual key, an icon, and the like), an operation on or near the touch panel 111 that covers the display panel 112. After detecting the operation on or near the touch panel, the touch panel 111 transmits the operation to the processor 101 to determine user input, and then the processor 101 provides corresponding visual output on the display panel 112 based on the user input. In FIG. 1, the touch panel 111 and the display panel 112 serve as two independent components to implement input and output functions of the terminal 100. However, in some embodiments, the touch panel 111 and the display panel 112 may be integrated to implement the input and output functions of the terminal 100.

The RF circuit 104, the speaker 106, and the microphone 107 may provide an audio interface between the user and the terminal 100. The audio circuit 105 may convert received audio data into a signal, and transmit the signal to the speaker 106, and the speaker 106 converts the signal into a voice signal for output. In addition, the microphone 107 may convert a collected voice signal into a signal, and the audio circuit 105 receives the signal, converts the signal into audio data, and then outputs the audio data to the RF circuit 104, to send the audio data to a device such as another terminal, or output the audio data to the memory 102, so that the processor 101 performs further processing with reference to content stored in the memory 102. In addition, the camera 103 may collect an image frame in real time and send the image frame to the processor 101 for processing, and store a processed result in the memory 102 and/or display a processed result to the user by using the display panel 112.

As a control center of the terminal 100, the processor 101 is connected to each part of the entire terminal 100 by using various interfaces and lines, and performs various functions of the terminal 100 and data processing by running or executing the software program and/or the module stored in the memory 102 and invoking data stored in the memory 102, to perform overall monitoring on the terminal 100. It should be noted that the processor 101 may include one or more processing units. An application processor and a modem processor may be integrated into the processor 101. The application processor mainly processes an operating system, a user interface (User Interface, UI), an application, and the like. The modem processor mainly processes wireless communication. Alternatively, it can be understood that the modem processor may not be integrated into the processor 101.

The terminal 100 may further include the power supply 114 (for example, a battery) that supplies power to each component. In this embodiment of this application, the power supply 114 may be logically connected to the processor 101 by using a power management system, to manage functions such as charging, discharging, and power consumption by using the power management system.

In addition, a component not shown in FIG. 1 also exists. For example, the terminal 100 may further include a Bluetooth module, and details are not described herein.

The embodiments of this application may be applied to a communications system, and the communications system includes at least two routers. In addition, the at least two routers include at least one first router connected to the Internet (Internet) through a wide area network (Wide Area Network, WAN) interface and at least one second router connected to the first router in a wired manner through a local area network (Local Area Network, LAN) interface, so as to build a local area network. In other words, the communications system includes at least one router that is indirectly connected to the Internet by using another router, and the another router is connected to the Internet. It should be noted that the communications system may be implemented as a company network, a home network, or the like. This is not limited herein.

Figure 2:
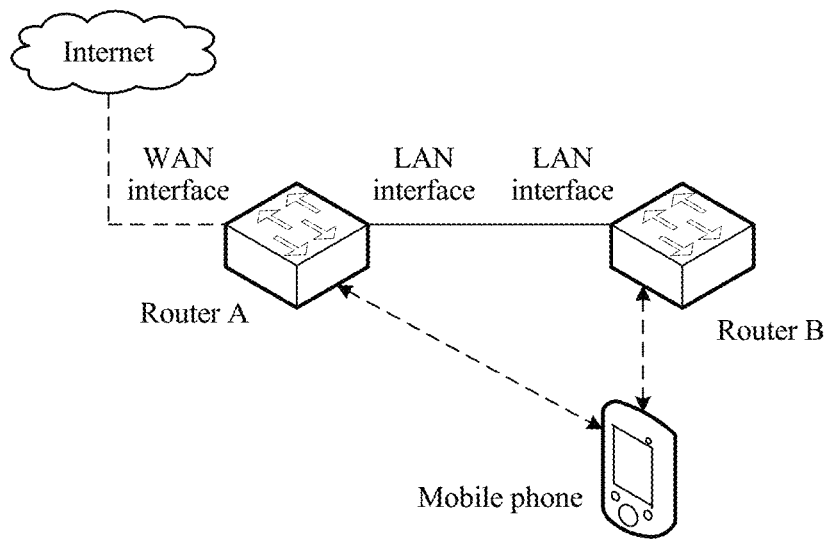
FIG. 2 is a schematic structural diagram of a communications system according to an embodiment of this application.

The home network is used as an example. For example, a user disposes a router in a bedroom, and attempts to use a mobile phone to implement a data service in a living room by using the router. Because of a wall between the bedroom and the living room, a signal is probably weakened or the user cannot access the router in the living room by using the mobile phone. In this case, the user may dispose another router in the living room, and connect the two routers in a wired manner. Then, the user may use the mobile phone to implement the data service in the living room by using the another router. For example, FIG. 2 shows an example communications system according to an embodiment of this application. The communications system includes at least a router A and a router B. The router A is connected to the Internet through a WAN interface, and the router B and the router A are connected to each other in a wired manner through their respective LAN interfaces. For example, the communications system is a home network. Considering a limited coverage area of a wireless local area network such as a Wireless Fidelity (Wireless Fidelity, Wi-Fi) technology and the Wi-Fi signal weakened by a wall at home, to enable the user to better experience a high-speed Internet access environment at home, the router B may be further disposed at home currently in addition to the router A, so as to connect the mobile phone to the Internet.

In this embodiment of this application, because the router A and the router B are manufactured by different manufacturers or are two routers of different models manufactured by a same manufacturer, and so on, the router A and the router B may belong to different network segments. For example, a gateway address of the router A is 192.168.43.1, and a gateway address of the router B is 192.168.1.1. In other words, numbers of a third segment and a fourth segment of the gateway address of the router A are different from those of the gateway address of the router B. For example, the mobile phone broadcasts, by using an antenna (such as a Wi-Fi antenna) of the mobile phone, a message used to obtain an Internet Protocol address (Internet Protocol Address, IP address). After the router A receives the message, an IP address allocated to the mobile phone is 192.168.43.120. After the router B receives the message, an IP address allocated to the mobile phone is 192.168.1.137. Currently, the mobile phone uses a first-received allocated IP address as an IP address for implementing a data service, and discards a later received message that carries an allocated IP address. However, in a scenario shown in FIG. 2, when the mobile phone first receives the IP address that is sent by the router B and that is allocated to the mobile phone, because the router B is connected to the Internet by using the router A and the router B does not send, to the mobile phone, the IP address that is allocated by the router A to the mobile phone, the mobile phone cannot implement the data service by using the IP address allocated by the router B to the mobile phone. Currently, the user may make repeated attempts by performing manual network connection and disconnection, so that the mobile phone can preferentially receive the IP address allocated by the router A to the mobile phone, and therefore implement the data service. However, this process is usually time-consuming and has a relatively low success rate. Alternatively, the user may configure the router B, so that the router B does not respond to any received message used to obtain an IP address. However, this configuration process is relatively cumbersome, and it is usually difficult for the user to accurately complete the entire configuration process.

Figure 3:
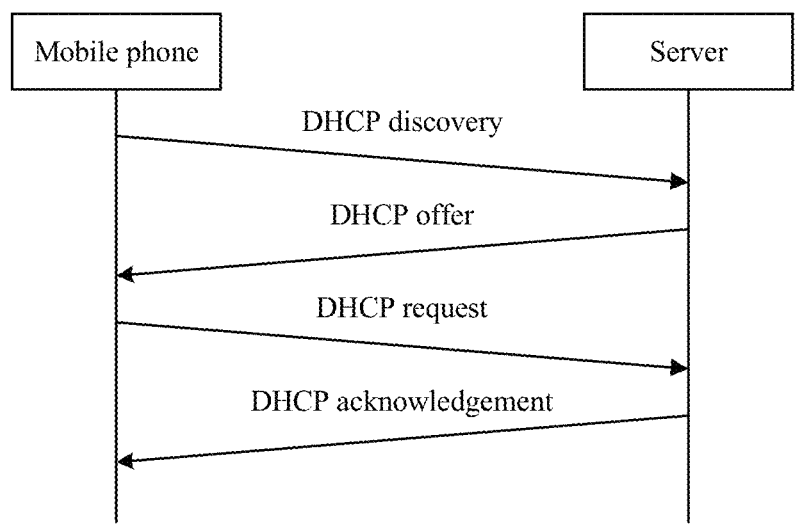
FIG. 3 is an interaction diagram of a DHCP process according to an embodiment of this application.

FIG. 3 is a schematic diagram of a principle of a Dynamic Host Configuration Protocol (Dynamic Host Configuration Protocol, DHCP) operation implemented by a mobile phone and a server in a same broadcast domain. The mobile phone is an example implementation form of a DHCP client (DHCP Client), but this embodiment of this application is not limited thereto. In this embodiment of this application, because the mobile phone and the server are in the same broadcast domain, the mobile phone and the server can receive broadcast packets sent by each other. It should be noted that, when the mobile phone and the server are not in the same broadcast domain, a device having a forwarding function such as a first router or a second router provided in this embodiment of this application may serve as a device that implements a forwarding function between the mobile phone and the server, so as to implement a DHCP operation between the mobile phone and the server in different broadcast domains.

By using an example of implementing a DHCP operation between a mobile phone and a server in a same broadcast domain, the following describes a process of a DHCP-based request for an IP address by the mobile phone and a subsequent configuration process. It can be learned from FIG. 3 that the process may include four phases: DHCP discovery (DISCOVER), DHCP offer (OFFER), DHCP request (REQUEST), and DHCP acknowledgement (Acknowledge, ACK).

The DHCP discovery indicates that the mobile phone sends a broadcast on a physical subnet to search for an available DHCP server, namely, the server shown in FIG. 3. Content of the broadcast is a DHCP packet, for example, a DHCP DISCOVER message. The DHCP packet carries an identifier of the mobile phone.

The DHCP offer indicates that, when the DHCP server receives an IP lease request from the mobile phone, in other words, when the DHCP server receives the foregoing DHCP packet, the DHCP server provides the mobile phone with an IP lease. In other words, the DHCP server reserves an IP address for the mobile phone, and then unicasts an offer packet to the mobile phone through the network. The offer packet carries a MAC address of the mobile phone, the IP address provided by the DHCP server for the mobile phone, a subnet mask, lease duration, and an IP address of the DHCP server that provides the mobile phone with the IP address.

The DHCP request indicates that, when the mobile phone receives an IP address lease offer, the mobile phone may notify all other DHCP servers that the mobile phone has accepted one IP address lease offer. Therefore, the mobile phone may send a DHCP REQUEST message including an IP address of a server that provides the lease. After the other DHCP servers receive the DHCP REQUEST message, these DHCP servers may withdraw all leases of IP addresses that may be provided for the mobile phone. Then, the DHCP servers return the IP addresses previously reserved for the mobile phone into an available IP address pool, so that the DHCP servers can allocate a returned IP address in the available IP address pool to another DHCP client.

The DHCP acknowledgement indicates that, after the DHCP server receives the DHCP REQUEST message from the client, the DHCP server starts a final phase of the configuration process. This response phase includes: sending a DHCP ACK message to the mobile phone. The DHCP ACK message includes lease duration of the IP address, and may further include other configuration information requested by the mobile phone. At this time, a Transmission Control Protocol (Transmission Control Protocol, TCP)/IP configuration process is completed. In this embodiment of this application, the DHCP ACK message may be alternatively implemented as a DHCP ACK packet.

Figure 4:
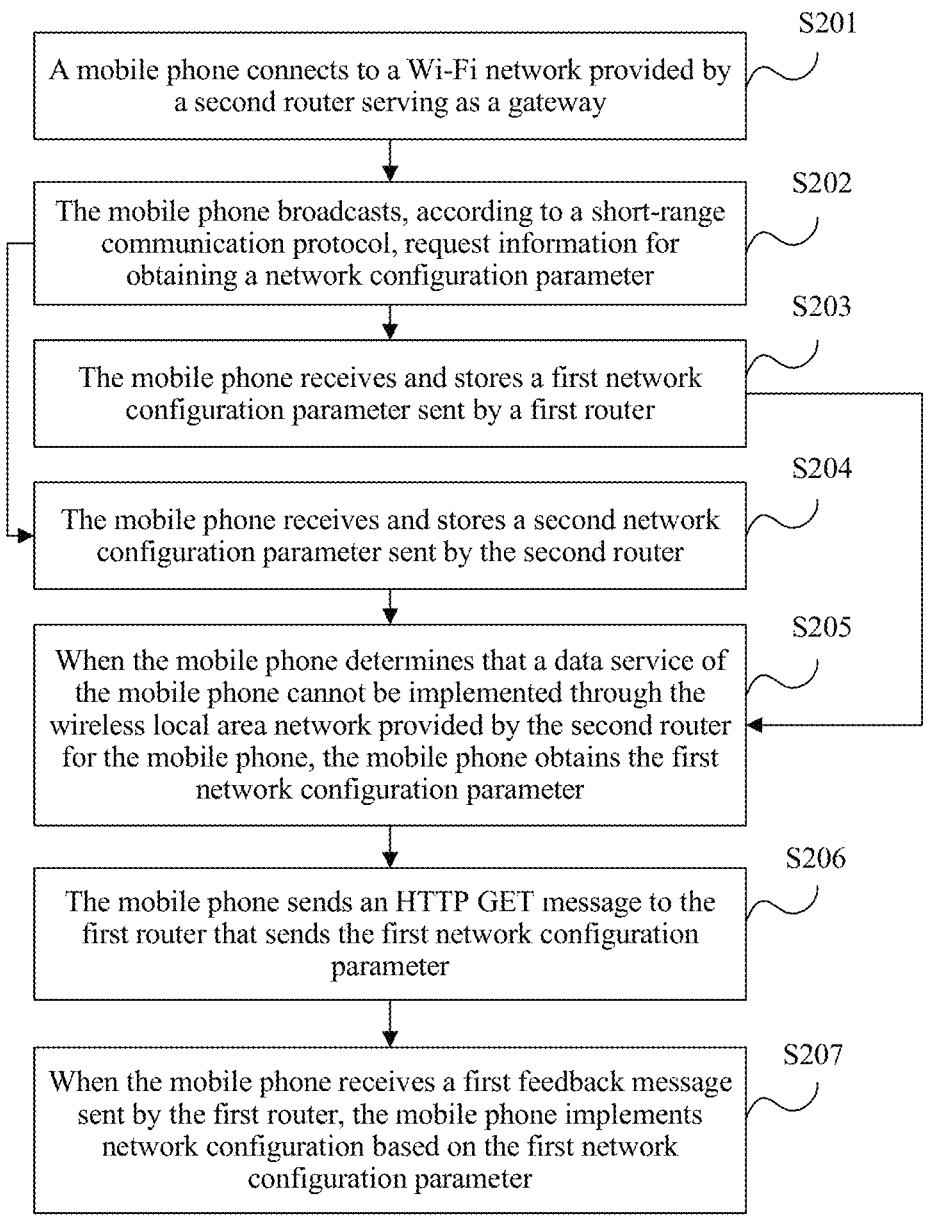
FIG. 4 is a flowchart of a first data service implementation method according to an embodiment of this application.

To resolve the foregoing problem that the user can implement the data service only when the user completes an operation because the mobile phone first receives an IP address sent by the router B, this application provides a data service implementation method. A method procedure shown in FIG. 4 is used as an example. The method procedure may include steps S201 to S207. In this embodiment of this application, for ease of description, the terminal 100 is a mobile phone in this specification. However, it should be noted that the mobile phone is only an example device to which this embodiment of this application is applicable, and an application scenario in this embodiment of this application is not limited thereto.

S201. The mobile phone connects to a Wi-Fi network provided by a second router serving as a gateway.

In this embodiment of this application, the mobile phone connects to the Wi-Fi network provided by the second router serving as the gateway, and this is an example implementation of establishing a wireless local area network connection between the terminal and the second router.

For example, the user may establish a connection to a wireless local area network in a setting interface or a drop-down shortcut menu. If the mobile phone was previously connected to the second router, configuration information related to the connection to the second router has already been stored. In this case, after obtaining the configuration information related to the connection to the second router, the mobile phone may automatically access the Wi-Fi network by using the configuration information. If the mobile phone is connected to the second router for the first time, related configuration information needs to be entered on a related user interface to connect to the Wi-Fi network. It can be learned that, after the mobile phone automatically accesses a Wi-Fi network or the user manually selects a Wi-Fi network, the mobile phone may access the Wi-Fi network. For example, in this embodiment of this application, the user may be connected to the second router by using the mobile phone, so that the mobile phone accesses the Wi-Fi network provided by the second router serving as the gateway.

S202. The mobile phone broadcasts, according to a short-range communication protocol, request information for obtaining a network configuration parameter.

The request information may be a DHCP DISCOVER message that is broadcast by the mobile phone. The DHCP DISCOVER message may be a message that is broadcast by the mobile phone by using an antenna of the mobile phone after the mobile phone is connected to the second router and that is used to obtain an Internet Protocol address (Internet Protocol Address, IP address) used for accessing the Wi-Fi network.

In this embodiment of the present invention, both a first router and the second router may receive the message. Therefore, after receiving the message, either of the routers allocates, to the mobile phone, the IP address used for accessing the Wi-Fi network. To be specific, the first router allocates an IP address to the mobile phone, and the second router also allocates an IP address to the mobile phone.

It can be learned that the mobile phone receives one or more data packets. As shown in steps S203 and S204, the mobile phone determines a data packet type, and stores DHCP OFFER packets received by the mobile phone, namely, DHCP OFFER packets.

S203. The mobile phone receives and stores a first network configuration parameter sent by a first router.

S204. The mobile phone receives and stores a second network configuration parameter sent by the second router.

The first network configuration parameter may be carried in a DHCP OFFER packet sent by the first router, and the second network configuration parameter may be carried in a DHCP OFFER packet sent by the second router. In this embodiment of this application, the first network configuration parameter may include a first IP address and a first gateway address that are carried in a first DHCP OFFER packet sent by the first router to the mobile phone; and the second network configuration parameter may include a second IP address and a second gateway address that are carried in a second DHCP OFFER packet sent by the second router to the mobile phone.

In the prior art, after sending a message used to obtain an IP address, the mobile phone receives a first-received DHCP OFFER packet, and discards DHCP OFFER packets other than the first-received DHCP OFFER packet. In this application compared with the prior art, after sending a message used to obtain an IP address, the mobile phone stores each received DHCP OFFER packet for use in a subsequent network repair process.

The data packet type includes but is not limited to a DHCP OFFER packet, a DHCP ACK packet, and the like. After receiving data packets, the mobile phone may identify types of the data packets by parsing the data packets, and then store a DHCP OFFER packet of the received data packets.

In an example implementation of this embodiment of this application, a storage manner may be shown in Table 1. In other words, a data packet is stored by using a gateway as a keyword.

TABLE 1

| Keyword | Data packet content |
| --- | --- |
| First gateway | DhcpInfo1 (an IP address 192.168.1.137, a DNS server, a gateway address 192.168.1.1, and lease duration of the IP address 192.168.1.137) |
| Second gateway | DhcpInfo2 (an IP address 192.168.43.20, a DNS server, a gateway address 192.168.43.1, and lease duration of the IP address 192.168.43.20) |

The first gateway is the first router serving as the gateway, and the second gateway is the second router serving as the gateway. In Table 1, the data packet content includes but is not limited to an IP address allocated by a gateway to the mobile phone, a domain name system (Domain Name System, DNS) server, a gateway address, and lease duration of the IP address allocated to the mobile phone. For content carried in the DHCP OFFER packet, refer to the prior art. Details are not described herein.

The lease duration of the IP address is a period of leasing a DHCP service in a router, namely, a lease time of the IP address. For the mobile phone, when the time arrives, the IP address is released, and a data service can continue to be implemented after the IP address is re-leased and a new IP address is allocated.

For example, as shown in Table 1, DhcpInfo1 includes the IP address 192.168.1.137, the DNS server, the gateway address 192.168.1.1, and the lease duration of the IP address 192.168.1.137. The DNS server may be represented as 192.168.1.1.

For another example, as shown in Table 1, DhcpInfo2 includes the IP address 192.168.43.20, the DNS server, the gateway address 192.168.43.1, and the lease duration of the IP address 192.168.43.20. The DNS server may be represented as 192.168.43.1.

It should be noted that, in the storage manner shown in Table 1, each data packet is stored by using a gateway as a keyword. Considering a time sequence of receiving data packets by the mobile phone, sequential storage may be implemented in a storage process according to the time sequence of receiving data packets. For example, in Table 1, the mobile phone first receives a DHCP OFFER packet sent by the first gateway, and then receives a DHCP OFFER packet sent by the second gateway. Certainly, the mobile phone may perform classification, storage, and the like on received DHCP OFFER packets in another manner, and this is not limited herein.

Because the mobile phone performs configuration by using content carried in the first DHCP OFFER packet received after the mobile phone sends the message for obtaining the IP address, to implement the data service, for DHCP OFFER packets other than the first DHCP OFFER packet that are received by the mobile phone, the mobile phone may store, in a form shown in Table 1, the DHCP OFFER packets locally in the mobile phone, to be specific, in a memory of the mobile phone. Alternatively, the mobile phone stores Table 1 in a third-party device such as a server or in a cloud through network or Bluetooth communication or the like, and when the mobile phone needs to use content stored in Table 1, the mobile phone obtains the content from a corresponding storage location of the content, thereby saving storage space of the mobile phone.

In a case in which the mobile phone stores Table 1 in the memory of the mobile phone, the content stored in Table 1 can be conveniently and quickly obtained when the mobile phone repairs the network. It means that locally storing Table 1 in the mobile phone can save a time of obtaining content in the received DHCP OFFER packet by the mobile phone, so that a reading process of the mobile phone is more convenient. In a case in which the content stored in Table 1 is stored in the third-party device or the cloud, the storage space of the mobile phone is effectively saved.

S205. When the mobile phone determines that a data service of the mobile phone cannot be implemented through the wireless local area network provided by the second router for the mobile phone, the mobile phone obtains the first network configuration parameter.

In an example implementation, the mobile phone may perform network configuration by using the first-received second network configuration parameter, and then check the network. A network checking manner of the mobile phone includes but is not limited to sending, by the mobile phone, an HTTP GET message to the second router. In this embodiment of this application, because the mobile phone does not receive a second feedback message sent by the second router in response to the HTTP GET message, the mobile phone determines that the data service of the mobile phone cannot be implemented through the wireless local area network provided by the second router for the mobile phone.

It should be noted that, if the data service of the mobile phone can be implemented through the wireless local area network provided by the second router for the mobile phone, after the mobile phone sends an HTTP GET message to the second router, the mobile phone may receive a second feedback message sent by the second router in response to the HTTP GET message.

For the HTTP GET message, refer to descriptions in step S206. Details are not described herein. For a feedback message, the second feedback message mentioned in this embodiment of this application is a message sent by the second router to the mobile phone in response to the HTTP GET message sent by the mobile phone.

Because the mobile phone stores the first network configuration parameter and the second network configuration parameter, when determining that the data service of the mobile phone cannot be implemented through the wireless local area network provided by the second router for the mobile phone, the mobile phone may obtain the first network configuration parameter from a storage location of the first network configuration parameter and the second network configuration parameter.

S206. The mobile phone sends an HTTP GET message to the first router that sends the first network configuration parameter.

The HTTP GET message is a message that is sent by the mobile phone to a router and that is used to obtain an IP address of a server. After receiving the message, the router sends the message to the server, and then the server may feed back a message to the mobile phone. For example, the server feeds back, to the mobile phone by using the router, a response message that carries a value between 200 and 400, so as to notify the mobile phone that a data service can be implemented between the mobile phone and the server.

In this embodiment of this application, the mobile phone may actively send the HTTP GET message to the first router. When the mobile phone does not receive, within a specific time, an HTTP GET feedback message sent by the first router, it is considered that a Wi-Fi network currently accessed by the mobile phone cannot provide the user with a data service function. It should be noted that, if the mobile phone may receive, within a specific time, an HTTP GET feedback message sent by the first router, it is considered that a Wi-Fi network currently accessed by the mobile phone can provide the user with a data service function. In other words, the first router may be considered as a gateway for currently implementing the data service by the mobile phone.

In an example implementation, to help the mobile phone use a same router to complete the data service next time, the mobile phone may store a gateway address of the connected first router, for example, add the gateway address of the first router to a gateway record of the mobile phone. It should be noted that, if the gateway address of the first router has already been stored in the gateway record, to save storage space, the gateway address of the first router may not be repeatedly stored.

The mobile phone sends an HTTP GET message to a connected gateway to check whether a Wi-Fi network accessed by the mobile phone is reachable. The specific time is used to indicate a time in which the mobile phone can receive the feedback message after the mobile phone sends the HTTP GET message. Duration of the specific time is not limited herein, and may be set based on a historical and empirical value before the mobile phone is delivered from a factory, or may be set by the user based on a historical experience value. Certainly, the user may adjust, based on the historical and empirical value, specific duration that is set before the mobile phone is delivered from the factory or specific duration that was previously set by the user.

It should be noted that, in addition to a process of checking whether the Wi-Fi network is reachable after the mobile phone performs network configuration based on the first received DHCP OFFER packet, the foregoing implementation of checking whether the Wi-Fi network is reachable is further applicable to another case in which whether the network is reachable is checked after the mobile phone completes network configuration.

S207. When the mobile phone receives a first feedback message sent by the first router, the mobile phone implements network configuration based on the first network configuration parameter.

The first feedback message is a message sent by the first router to the mobile phone in response to the HTTP GET message sent by the mobile phone.

In this embodiment of this application, when receiving the first feedback message, the mobile phone may determine to use the first network configuration parameter to implement network configuration, so that the mobile phone can implement the data service. Therefore, the mobile phone implements network configuration based on the first network configuration parameter.

It can be learned that, after the foregoing implementation is used, when the mobile phone determines that the data service of the mobile phone cannot be implemented through the wireless local area network provided by the second router for the mobile phone, the mobile phone may screen stored network configuration parameters sent by other routers, to find an appropriate network configuration parameter, for example, the first network configuration parameter sent by the first router. Then, the mobile phone may use the appropriate network configuration parameter to perform network configuration, to be specific, the mobile phone uses the first network configuration parameter to implement network configuration, so as to ensure data service implementation of the mobile phone.

In an example implementation of this embodiment of this application, the mobile phone may preliminarily screen, based on the gateway record, gateways accessed by the mobile phone. For example, the mobile phone preliminarily determines whether the data service of the terminal can be implemented through the wireless local area network provided by the second router for the mobile phone. After determining that there is a relatively high probability that the data service of the terminal cannot be implemented through the wireless local area network provided by the second router for the mobile phone, the mobile phone sends an HTTP GET message to the second router, to check the network.

In this way, the second router can be prevented from receiving a large quantity of HTTP GET messages from different mobile phones, and occupying a large quantity of resources to perform operations such as parsing and processing on each HTTP GET message. In other words, in this embodiment of this application, the mobile phone may send, only after the mobile phone preliminarily determines that the Wi-Fi network accessed by the mobile phone is unreachable, the HTTP GET message to the second router that provides the Wi-Fi network, so as to check whether the Wi-Fi network accessed by the mobile phone is reachable.

The following further describes the foregoing content by using an example implementation.

Figures 1, 5A:
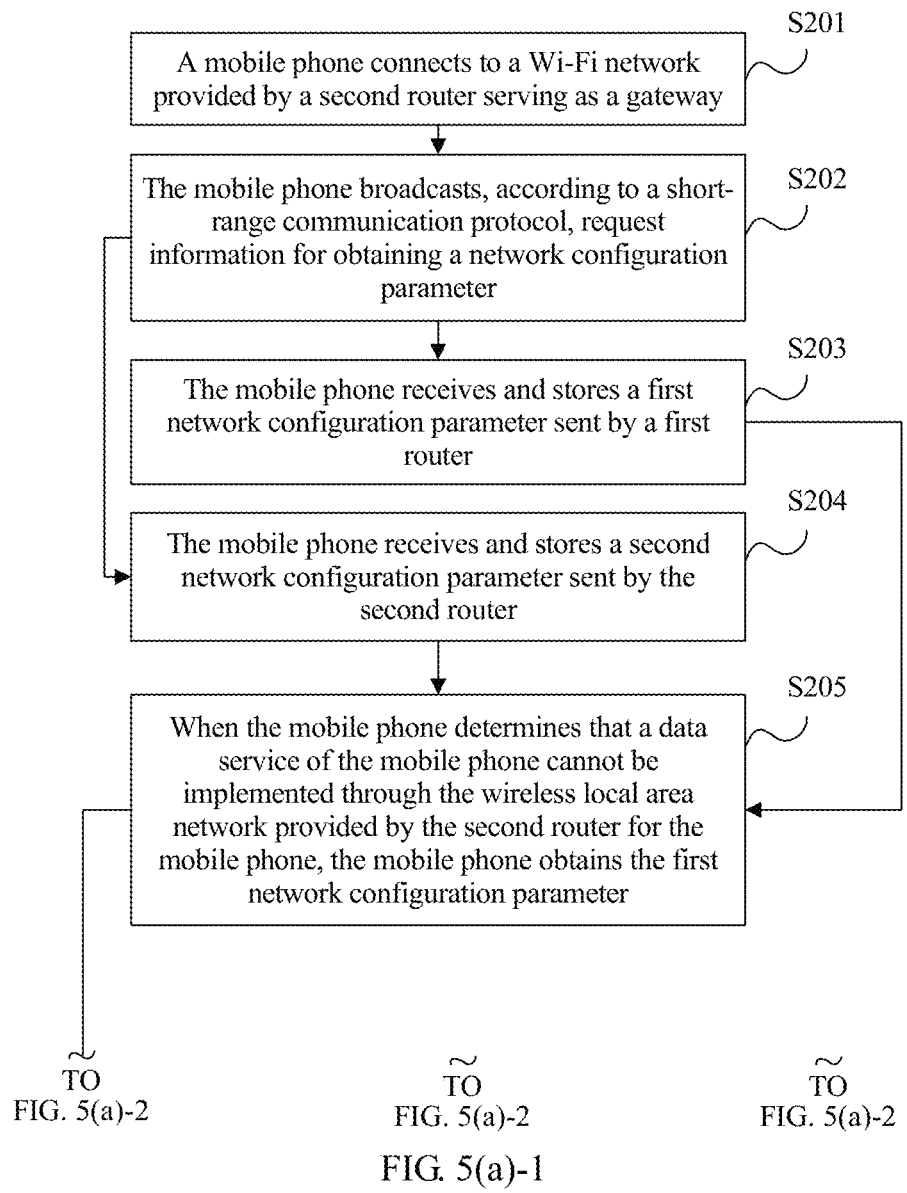
Figures 2, 5A:
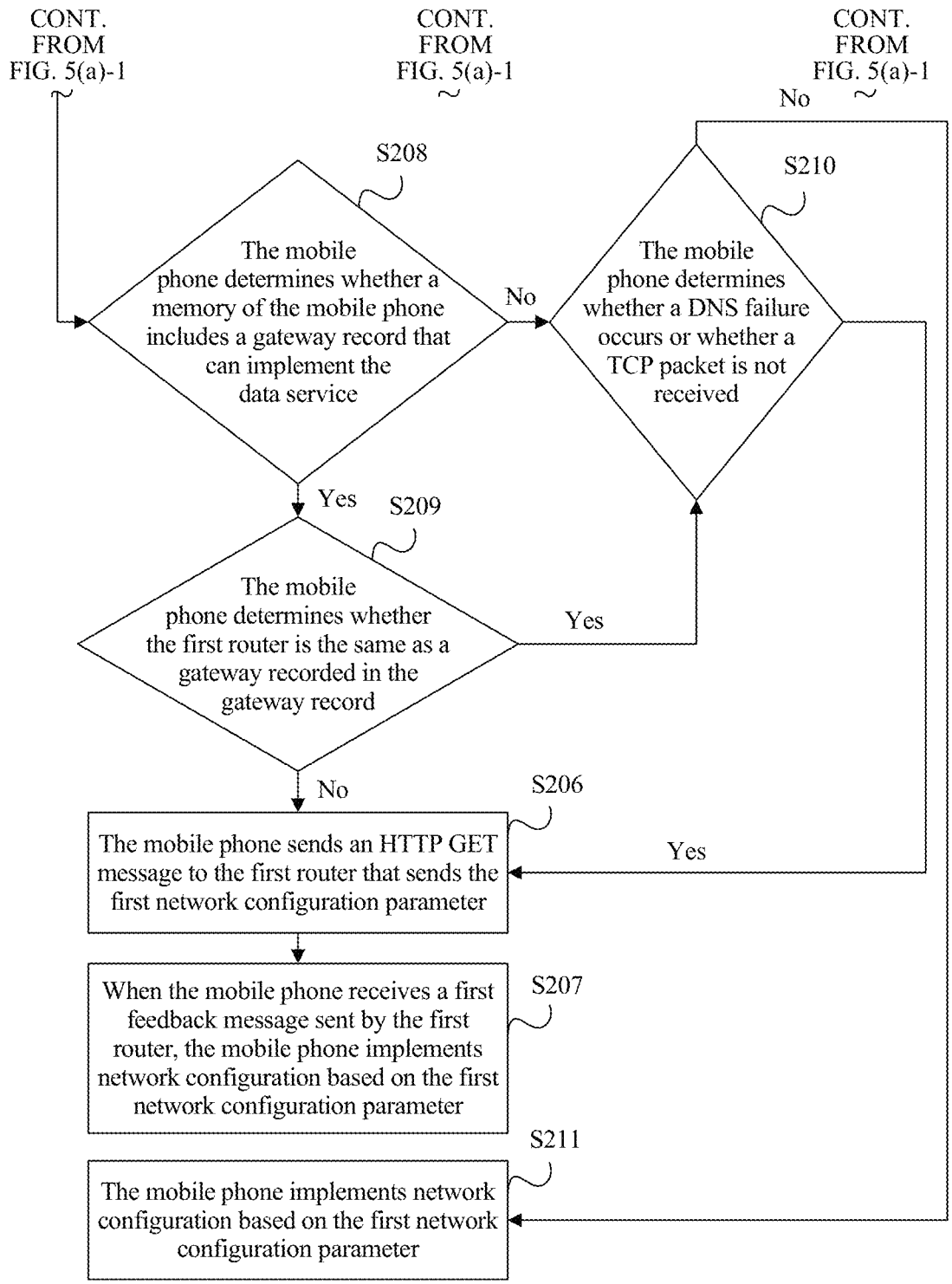

As shown in FIG. 5(*a*)-1 and FIG. 5(*a*)-2, before step S206 in which the mobile phone sends an HTTP GET message to the first router that sends the first network configuration parameter, steps S208 to S211 may be further performed.

S208. The mobile phone determines whether a memory of the mobile phone includes a gateway record that can implement the data service. If the memory of the mobile phone includes the gateway record that can implement the data service, step S209 is performed; or if the memory of the mobile phone does not include the gateway record that can implement the data service, step S210 is performed.

For example, after implementing the data service, the mobile phone may store the connected gateway implementing the data service. In this way, after the mobile phone initiates a message for obtaining an IP address next time, the mobile phone receives a DHCP OFFER packet, and may compare a gateway address carried in the received DHCP OFFER packet with a gateway address of the previously connected gateway implementing the data service. The gateway record includes but is not limited to the gateway address of the gateway connected to the mobile phone to implement the data service.

S209. The mobile phone determines whether the first router is the same as a gateway recorded in the gateway record. If the first router is the same as the gateway recorded in the gateway record, step S210 is performed; or if the first router is different from the gateway recorded in the gateway record, step S206 is performed.

It should be noted that the determining process may specifically include: comparing the gateway address of the first router connected to the mobile phone with a gateway address of the gateway recorded in the gateway record; and if the gateway address of the first router is the same as the gateway address of the gateway recorded in the gateway record, determining that the first router is the same as the gateway recorded in the gateway record; otherwise, determining that the first router is different from the gateway recorded in the gateway record.

S210. The mobile phone determines whether a DNS failure occurs or whether a TCP packet is not received. If the DNS failure occurs or the TCP packet is not received, step S206 is performed; or if the DNS failure does not occur or the TCP packet is not received, step S211 is performed.

In this embodiment of this application, the mobile phone may implement automatic monitoring in a background. In other words, after the mobile phone completes network configuration based on the content carried in the first received DHCP OFFER packet, the mobile phone determines, in background, a quantity of DNS failures and whether a quantity of TCP packets increases. The DNS failure indicates that, in a period of time after the mobile phone sends a message for querying an IP address corresponding to a DNS to the router, the mobile phone does not receive the IP address fed back by the router. It should be noted that a DNS success indicates that, after receiving the message, the router finds the IP address from the server and then feeds back the IP address to the mobile phone. In other words, the mobile phone receives, in a period of time after sending the message, the IP address fed back by the router.

For example, after the DNS failure occurs, the mobile phone detects the DNS failure in the background and records that the DNS failure occurs once.

For another example, after receiving the data packet, the mobile phone can identify that a type of the data packet is a TCP packet. In this case, the mobile phone records the received TCP packet in the background. However, when the mobile phone does not receive the TCP packet, in other words, when the mobile phone determines, in the background, that a quantity of TCP packets received by the mobile phone is 0, it is considered that the mobile phone does not receive the TCP packet. In this embodiment of this application, the TCP packet includes but is not limited to TCP Rx packets.

S211. The mobile phone implements network configuration based on the first network configuration parameter.

It should be noted that, in a case in which the first router is the same as the gateway in the Internet access record, or the mobile phone does not obtain the gateway record, for example, if the mobile phone is a newly purchased mobile phone that has not accessed any Wi-Fi network, or because the gateway record is stored in the third-party device or the cloud, and the mobile phone currently cannot obtain the gateway record through the network, the mobile phone may actively send the HTTP GET message to the first router based on a monitor result in the background of the mobile phone when it is determined that the DNS failure occurs or that the TCP packet is not received. Then, the mobile phone may determine, by determining whether the HTTP GET feedback message sent by the first router is received within a specific time, whether the mobile phone can implement the data service. For a specific process of determining whether the mobile phone can perform the data service and a storage manner based on the gateway that can implement the data service, refer to the foregoing descriptions. Details are not described herein.

It can be learned that steps S208 to S211 may be performed as optional steps. Comparing an access gateway with a gateway record and determining, by the mobile phone, the DNS failure and whether the TCP packet is received are used as an example determining means provided in this application, so as to preliminarily obtain an available gateway through screening, thereby effectively reducing resources occupied by the mobile phone to send the HTTP GET message to the gateway to make a check.

In an example implementation of this embodiment of this application, in step S205, when the mobile phone determines that the data service of the mobile phone cannot be implemented through the wireless local area network provided by the second router for the mobile phone, the mobile phone may automatically repair the network. In other words, the mobile phone obtains the first network configuration parameter in step S205, and subsequently implements steps S206 to S211.

Figure 5B:
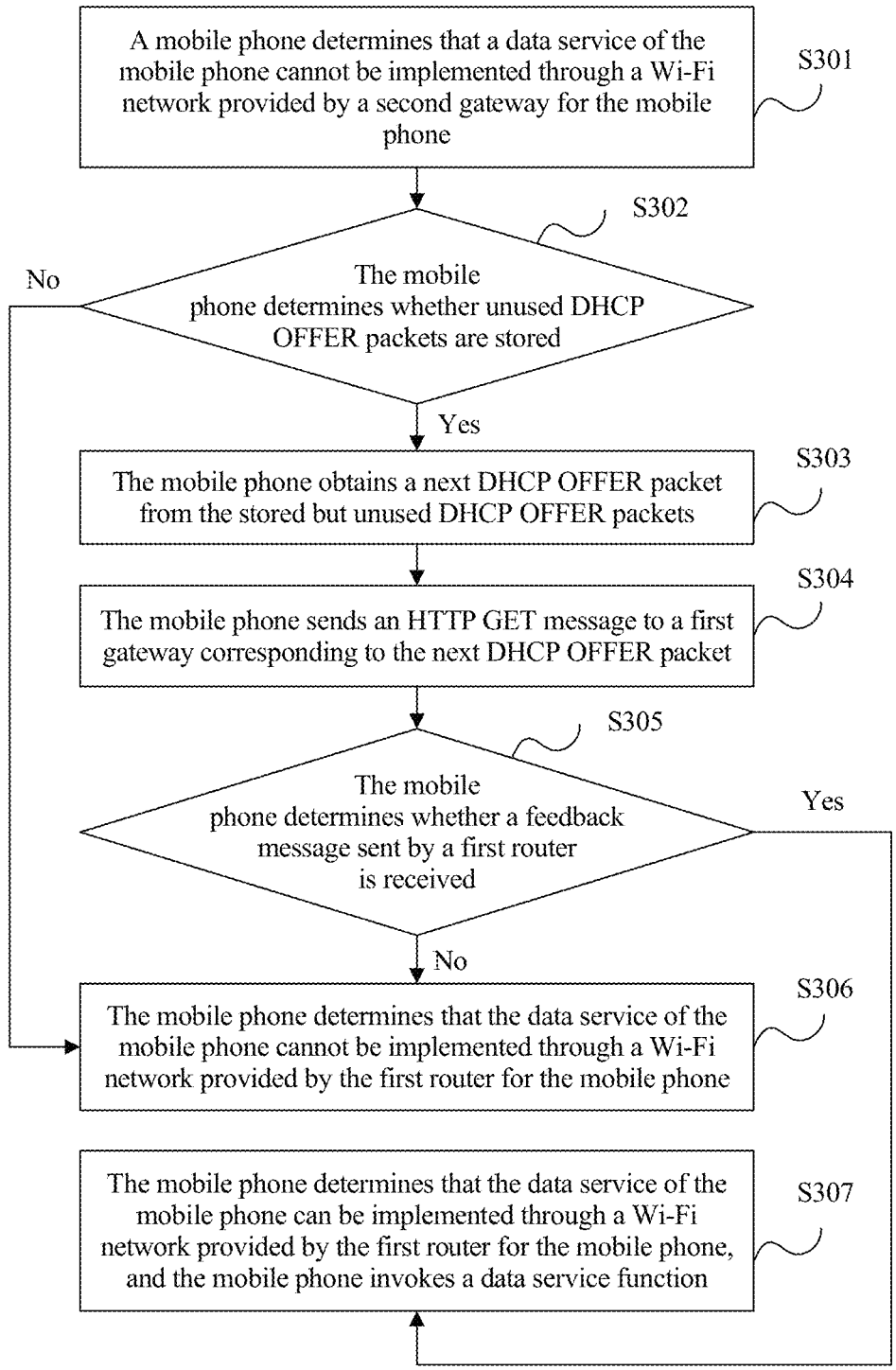
FIG. 5($a$)-1 and FIG. 5($a$)-2 are a flowchart of a second data service implementation method according to an embodiment of this application.

For example, FIG. 5(b) is a flowchart of a method in which a mobile phone automatically repairs a network. The method may include the following steps.

S301. The mobile phone determines that a data service of the mobile phone cannot be implemented through a Wi-Fi network provided by a second gateway for the mobile phone.

S302. The mobile phone determines whether unused DHCP OFFER packets are stored. If the mobile phone determines that the unused DHCP OFFER packets are stored, step S303 is performed; or if the mobile phone determines that the unused DHCP OFFER packets are not stored, step S306 is performed.

S303. The mobile phone obtains a next DHCP OFFER packet from the stored but unused DHCP OFFER packets.

In this embodiment of this application, the mobile phone may complete network configuration according to an order of content recorded in Table 1, to be specific, according to an up-down order in Table 1, until the mobile phone can implement the data service.

In some embodiments of this application, the mobile phone may use a gateway as a keyword, and attempt to perform network configuration by using received DHCP OFFER packets one by one according to a storage sequence of the received DHCP OFFER packets. It should be noted that selecting an offer packet by using an unused gateway as the keyword is an example implementation, and this embodiment of this application is not limited thereto.

For example, after completing network configuration by using a DHCP OFFER packet, the mobile phone may further label the DHCP OFFER packet, so as to indicate that the DHCP OFFER packet has been used. In this way, when obtaining a next unused DHCP OFFER packet, the mobile phone may select an offer packet from unlabeled DHCP OFFER packets for current network configuration.

For another example, the mobile phone may discard a used DHCP OFFER packet. In this way, for the mobile phone, any DHCP OFFER packet locally stored in the mobile phone can be used to perform network configuration, and a same DHCP OFFER packet is not repeatedly used to perform network configuration.

For the mobile phone, if the data service cannot be implemented after network configuration is completed based on a specific DHCP OFFER packet, the mobile phone obtains a next DHCP OFFER packet stored after the specific DHCP OFFER packet in Table 1, and completes network configuration based on content carried in the next DHCP OFFER packet. In other words, network configuration is DHCP configuration, and may also be referred to as networking parameter configuration.

S304. The mobile phone sends an HTTP GET message to a first gateway corresponding to the next DHCP OFFER packet.

The mobile phone automatically sends the HTTP GET message to the first router, so as to determine whether the mobile phone can implement the data service by using the first router.

S305. The mobile phone determines whether a feedback message sent by a first router is received. If the mobile phone receives the feedback message sent by the first router, step S307 is performed; or if the mobile phone does not receive the feedback message sent by the first router, step S306 is performed.

It should be noted that, for a method in which the mobile phone determines whether the mobile phone can implement the data service by using the first router, refer to the foregoing descriptions, and details are not described herein.

S306. The mobile phone determines that the data service of the mobile phone cannot be implemented through a Wi-Fi network provided by the first router for the mobile phone.

In a case in which the mobile phone cannot implement the data service after completing network configuration by using all DHCP OFFER packets, the mobile phone may notify a user of this case through a pop-up prompt or the like, so as to prompt the user to select another Wi-Fi network for access. In other words, step S301 is performed. In this case, the mobile phone may continue to perform traversal in Table 1, until Table 1 does not include a new DHCP OFFER packet that can be used, and a current automatic network repair process ends.

S307. The mobile phone determines that the data service of the mobile phone can be implemented through the Wi-Fi network provided by the first router for the mobile phone, and the mobile phone invokes a data service function.

In this embodiment of this application, the mobile phone does not discard a subsequently received DHCP OFFER packet, but instead, the mobile phone stores all received DHCP OFFER packets. Then, the mobile phone first uses a first-received DHCP OFFER packet to complete network configuration. In addition, after network configuration cannot enable the mobile phone to implement the data service function, the mobile phone attempts to perform network configuration by using other received DHCP OFFER packets one by one, until the mobile phone can normally implement the data service. Certainly, if all DHCP OFFER packets recorded in Table 1 cannot be used by the mobile phone to implement the data service, the mobile phone may notify, in a form of a pop-up dialog box and the like, the user that the data service cannot be implemented through a Wi-Fi network selected by the user; and optionally recommend the user to select another Wi-Fi network. For example, the mobile phone optionally provides the user with other Wi-Fi networks that can be logged on without a password or relatively secure Wi-Fi networks, for the user to select.

The user may see, on a setting interface of a wireless local area network, a repair result presented after the mobile phone automatically repairs the network. For example, display interfaces are shown in FIG. 6(a) to FIG. 6(d). After enabling a wireless local area network function, the user may switch, by tapping an area shown in FIG. 6(a), a display interface to a setting interface related to the wireless local area network shown in FIG. 6(b). It can be seen that the Wi-Fi network accessed by the mobile phone is referred to as a wireless local area network "A". The user may tap a virtual button shown in the figure, to enter an interface shown in FIG. 6(c). Referring to the application scenario shown in FIG. 2, the mobile phone performs network configuration by using the DHCP OFFER packet sent by the router B. It can be learned from the foregoing diagnosis procedure that the mobile phone cannot implement the data service through a Wi-Fi network provided by a gateway B (in other words, the router B serves as a gateway) accessed by the mobile phone. In this case, network configuration of the mobile phone is as follows:

IP address: 192.168.1.137
Gateway (router): 192.168.1.1

Figure 6A:
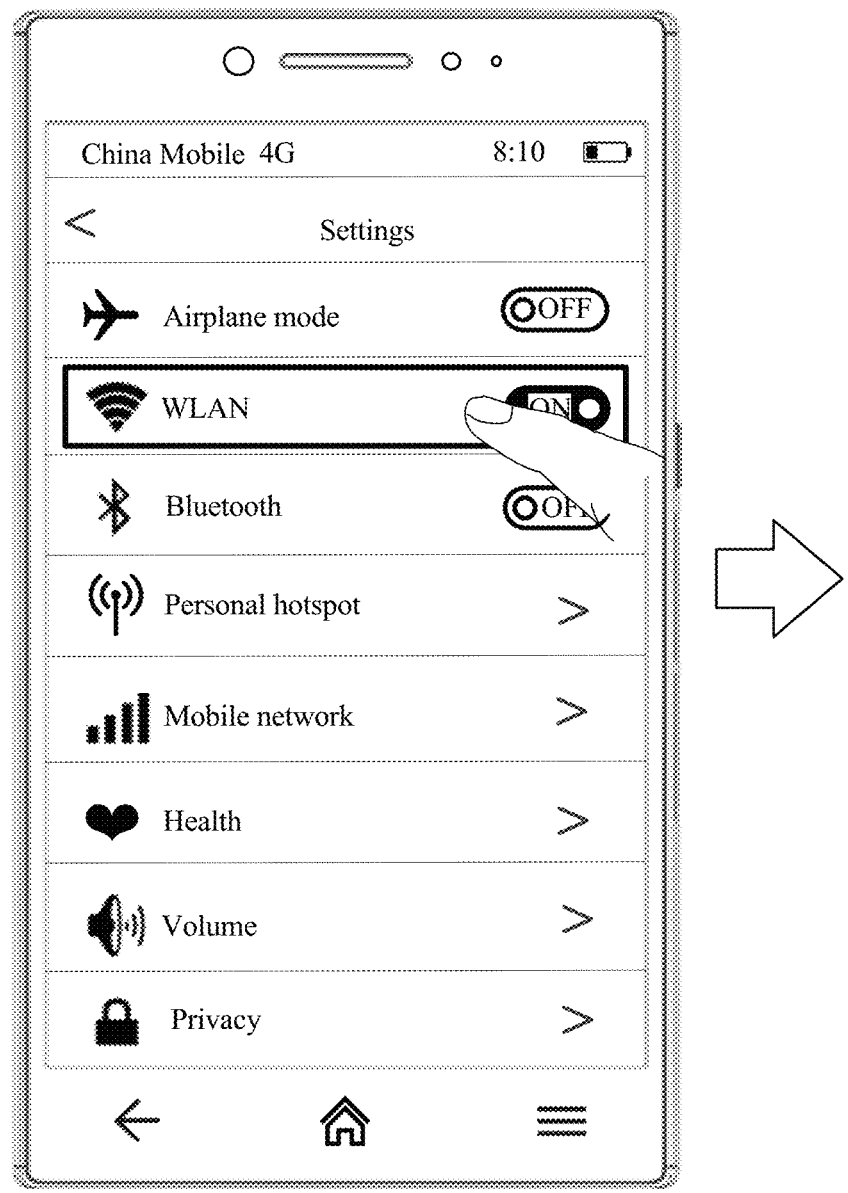
FIG. 6($a$) is a schematic diagram of a first mobile phone display interface according to an embodiment of this application.
Figure 6B:
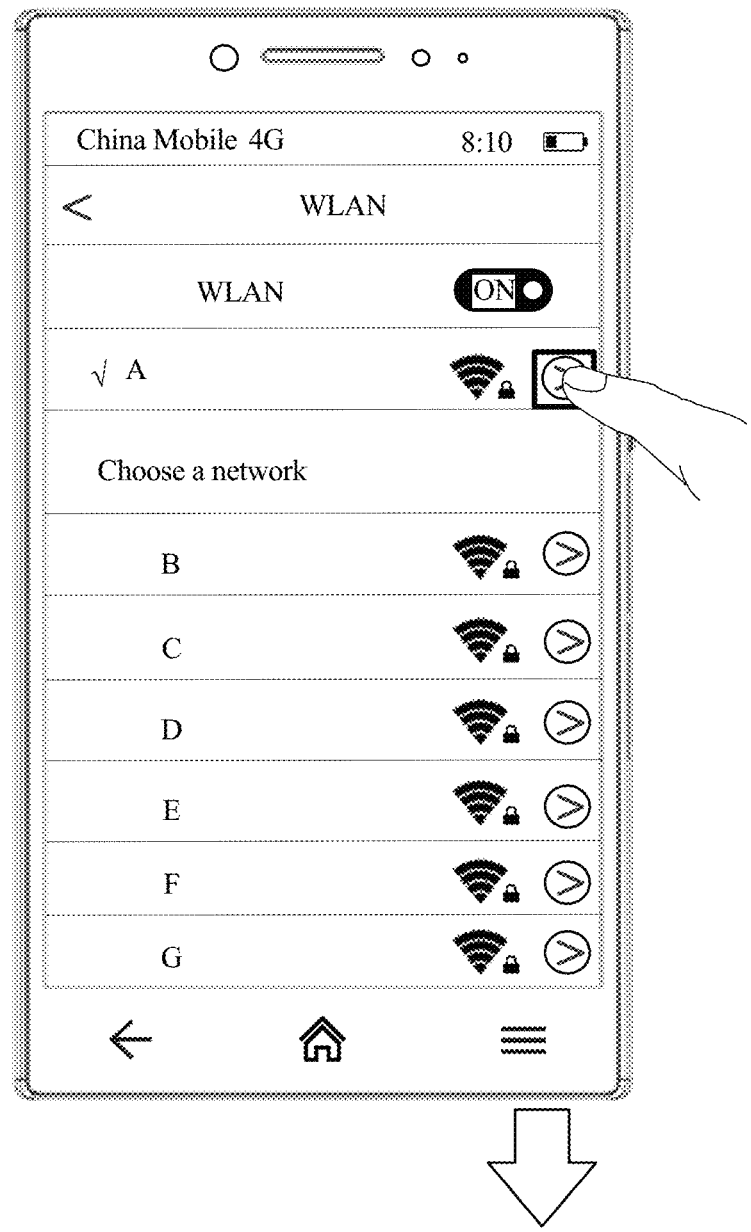
Figure 6C:
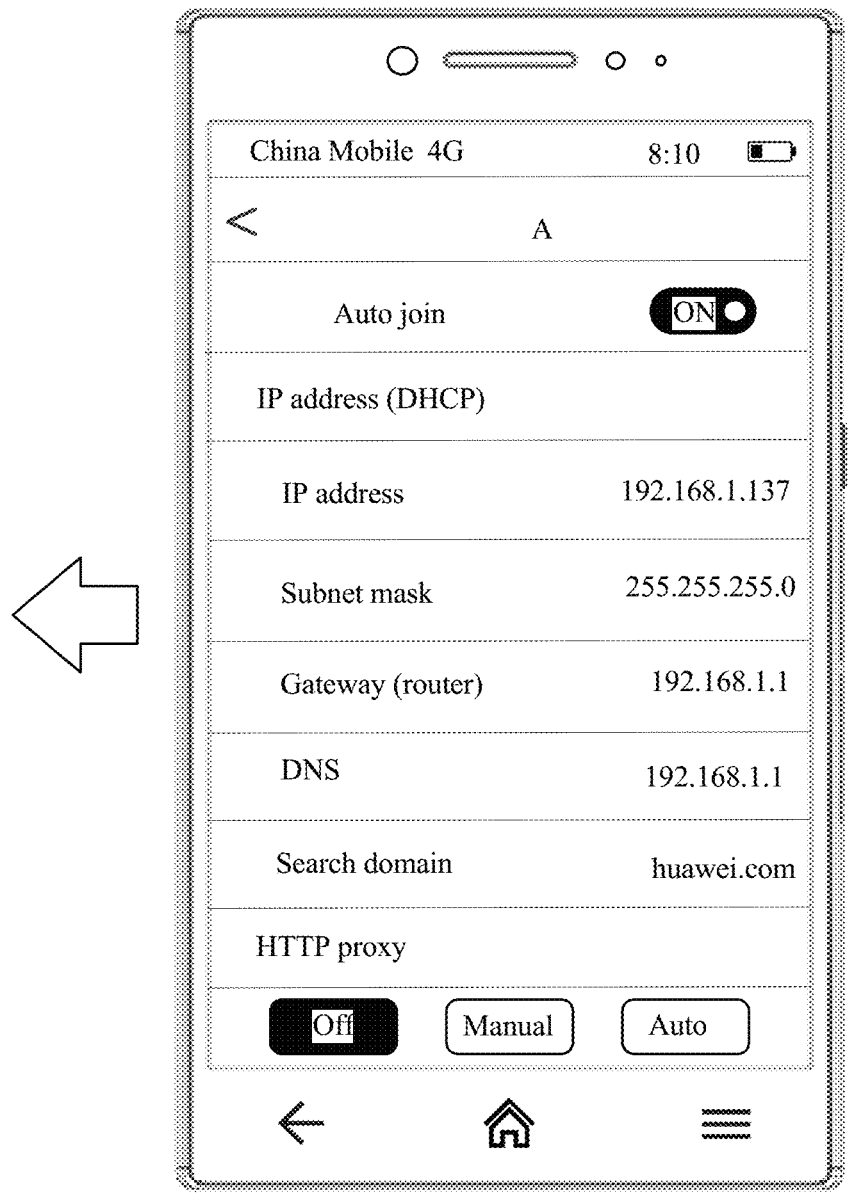
Figure 6D:
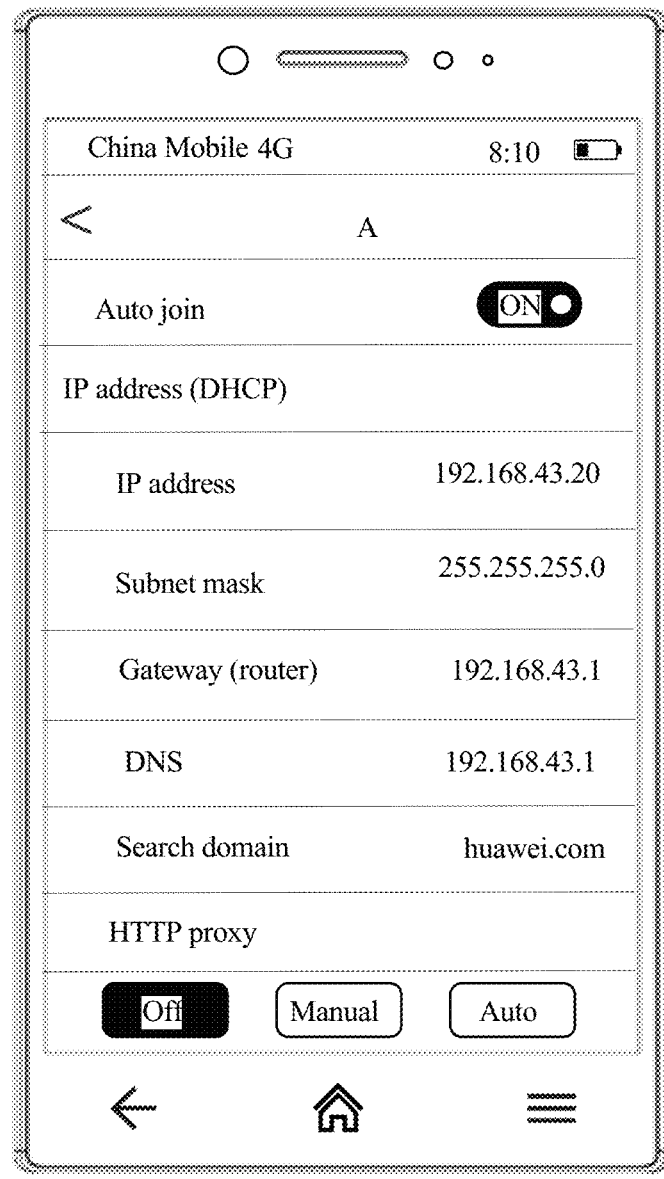

After the network is repaired by using the automatic repair procedure shown in FIG. 5(b), a configuration interface of the wireless local area network A in the mobile phone is changed from the interface shown in FIG. 6(c) to an interface shown in FIG. 6(d). In this case, network configuration of the mobile phone is as follows:

IP address: 192.168.43.20
Gateway (router): 192.168.43.1

Referring to the application scenario shown in FIG. 2, the mobile phone completes network configuration by using the DHCP OFFER packet sent by the router A, so that the mobile phone can implement the data service.

It should be noted that an implementation process shown in FIG. 6(a) to FIG. 6(d) is an example implementation scenario provided in this embodiment of this application, and this embodiment of this application is not limited thereto.

To improve user experience, the foregoing diagnosis and repair processes may not be presented to the user by using the mobile phone, and instead, after the network is automatically repaired, a network repair result shown in FIG. 6(d) is presented to the user. In other words, compared with content shown in FIG. 6(c) before the repair, an IP address and a gateway address of the wireless local area network accessed by the mobile phone change.

In the embodiments of this application, a data service implementation apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software function module. It should be noted that the module division in the embodiments of this application is an example, is merely logical function division, and may be other division during actual implementation.

Figure 7:
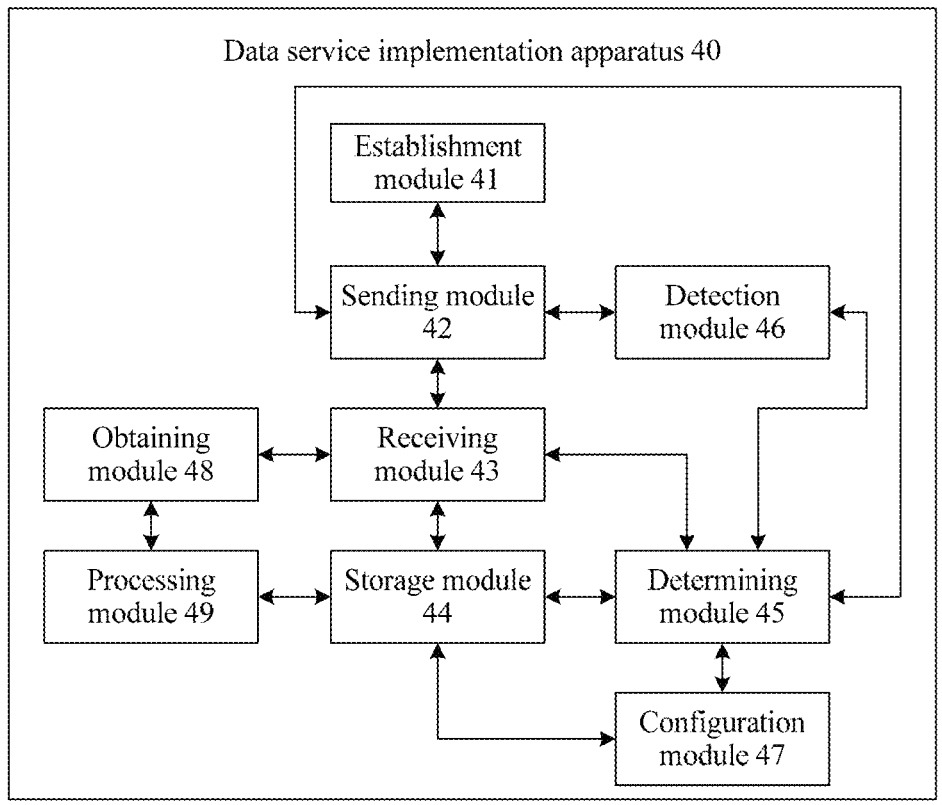
FIG. 7 is a schematic structural diagram of a data service implementation apparatus according to an embodiment of this application.

FIG. 7 is an example schematic structural diagram of a data service implementation apparatus in the foregoing embodiments. A data service implementation apparatus 40 includes an establishment module 41, a sending module 42, a receiving module 43, a storage module 44, a determining module 45, a detection module 46, a configuration module 47, and an obtaining module 48.

The establishment module 41 is configured to support the apparatus 40 in establishing a wireless local area network connection to a router. The sending module 42 is configured to support the apparatus 40 in broadcasting, according to a short-range communication protocol, a data service request such as a second data service request sent to a second router, an HTTP GET message such as an HTTP GET message sent to a first router or the second router, and request information for obtaining a network configuration parameter. The receiving module 43 is configured to support the apparatus 40 in receiving a network configuration parameter sent by each router, for example, a first network configuration parameter sent by the first router and a second network configuration parameter sent by the second router, and a feedback message sent by each router in response to the HTTP GET message, for example, a first feedback message sent by the first router in response to the HTTP GET message and a second feedback message sent by the second router in response to the HTTP GET message. The storage module 44 is configured to: support the apparatus 40 in storing a DHCP OFFER message or the network configuration parameter sent by each router, for example, a first DHCP OFFER message or the first network configuration parameter sent by the first router and a second DHCP OFFER message or the second network configuration parameter sent by the second router; and support the apparatus 40 in storing program code and data of a terminal. The determining module 45 is configured to support the apparatus 40 in determining whether each router is the same as a stored historical gateway record, whether the feedback message sent by each router is received, a network configuration parameter in a plurality of received network configuration parameters that is used for network configuration, and whether a data service of the terminal can be implemented through a wireless local area network provided by each router for the terminal. The detection module 46 is configured to support the apparatus 40 in detecting whether a DNS failure or a TCP Rx failure occurs. The configuration module 47 is configured to support the apparatus 40 in performing network configuration based on a network configuration parameter carried in the DHCP OFFER message or based on the received network configuration parameter. The obtaining module 48 is configured to support the apparatus 40 in obtaining, from DHCP OFFER messages or the network configuration parameters stored by the terminal, the network configuration parameter used for network configuration. It should be noted that the sending module 42, the receiving module 43, and the obtaining module 48 may support data exchange between the apparatus 40 and each module in the terminal, and/or support communication between the terminal and each device such as a network side. In this embodiment of this application, the apparatus 40 may further include a processing module 49, configured to support the apparatus 40 in implementing other processes and the like of technologies described in this specification.

The establishment module 41, the determining module 45, the detection module 46, the configuration module 47, and the processing module 49 each may be implemented as a processor or a controller, for example, may be a CPU, a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or a combination thereof. The processor or the controller may implement or execute various example logic blocks, modules, and circuits described with reference to content disclosed in this application. Alternatively, the processor may be a combination of processors implementing a calculation function, for example, a combination of one or more microprocessors, or a combination of a DSP and a microprocessor. The sending module 42, the receiving module 43, and the obtaining module 48 each may be implemented as a transceiver, a transceiver circuit, a communications interface, or the like. The storage module 44 may be implemented as a memory.

Figure 8:
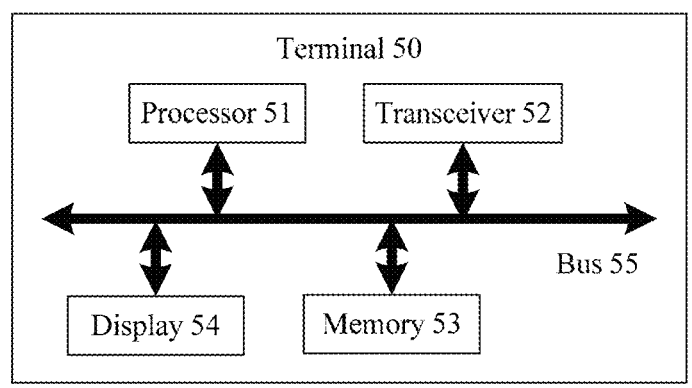
FIG. 8 is a schematic structural diagram of a second terminal according to an embodiment of this application.

The establishment module 41, the determining module 45, the detection module 46, the configuration module 47, and the processing module 49 each may be implemented as a processor, the sending module 42, the receiving module 43, and the obtaining module 48 each may be implemented as a transceiver, and the storage module 44 may be implemented as a memory. In addition, the terminal may further include a display, configured to present each interface. Therefore, as shown in FIG. 8, a terminal 50 includes a processor 51, a transceiver 52, a memory 53, a display 54, and a bus 55. The processor 51, the transceiver 52, the memory 53, and the display 54 are connected to each other by using the bus 55. The bus 55 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 8, but this does not mean that there is only one bus or only one type of bus.

Method or algorithm steps described in combination with the content disclosed in this application may be implemented by hardware, or may be implemented by a processor by executing a software instruction. The software instruction may include a corresponding software module. The software module may be stored in a random access memory (Random Access Memory, RAM), a flash memory, a read-only memory (Read-Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (Compact Disc Read-Only Memory, CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be deployed on a same device; or the processor and the storage medium may be deployed as discrete components on different devices.

An embodiment of this application provides a readable storage medium, including an instruction. When the instruction is run on a terminal, the terminal is enabled to perform the foregoing method.

An embodiment of this application provides a computer program product, the computer program product includes software code, and the software code is used to perform the foregoing method.

In the foregoing specific implementations, the objective, technical solutions, and beneficial effects of the embodiments of this application are further described in detail. It should be understood that the foregoing descriptions are merely specific implementations of this application, but are not intended to limit the protection scope of this application. Any modification, equivalent replacement, or improvement made based on the technical solutions of the embodiments of this application shall fall within the protection scope of the embodiments of this application.

What is claimed is:

1. A data service implementation method, wherein the method is implemented in a communications system, wherein the communications system comprises a terminal, a first router, and a second router, wherein the first router is connected to the second router in a wireless or wired manner, wherein the first router establishes a connection to the Internet, and wherein the method comprises:

establishing, by the terminal, a wireless local area network connection to the second router;

broadcasting, by the terminal and according to a short-range communication protocol, request information for obtaining a network configuration parameter;

receiving and storing, by the terminal, a first network configuration parameter sent by the first router;

receiving, by the terminal, a second network configuration parameter sent by the second router;

storing, by the terminal, the second network configuration parameter in a storage of the terminal where the first network configuration parameter is stored;

determining whether the terminal stores a gateway record comprising a gateway that can implement a data service;

in response to determining that the terminal stores the gateway record comprising the gateway that can implement the data service, determining whether the first router is the same as the gateway recorded in the gateway record;

in response to determining that the first router is the same as the gateway recorded in the gateway record and that the terminal does not detect at least one of a domain name system (DNS) failure or a Transmission Control Protocol (TCP) receive (Rx) failure, performing, by the terminal, network configuration by using the first network configuration parameter;

sending, by the terminal, a second data service request to the second router;

receiving, by the second router, the second data service request;

forwarding, by the second router, the second data service request to the first router based on a gateway address in the second data service request; and sending, by the first router, the second data service request to a server through the Internet, wherein the second data service request is used to implement a second data service of the terminal.

2. The method according to claim 1, wherein the method further comprises:

sending, by the terminal, a Hypertext Transfer Protocol (HTTP) GET message to the first router when the first router is the same as the gateway stored in the gateway record and the terminal detects the DNS failure or the TCP Rx failure.

3. The method according to claim 1, wherein the method further comprises:

sending, by the terminal, a HTTP GET message to the first router when the first router is different from the gateway stored in the gateway record.

4. The method according to claim 2, wherein the method further comprises:

when the terminal receives a feedback message sent by the first router in response to the HTTP GET message, performing, by the terminal, network configuration by using the first network configuration parameter.

5. The method according to claim 4, wherein the method further comprises:

when the terminal does not receive the feedback message sent by the first router in response to the HTTP GET message, performing, by the terminal, network configuration by using the second network configuration parameter.

6. The method according to claim 1, wherein the first network configuration parameter comprises a first Internet Protocol (IP) address and a first gateway address that are carried in a first Dynamic Host Configuration Protocol (DHCP) OFFER message sent by the first router to the terminal; and wherein the second network configuration parameter comprises a second IP address and a second gateway address that are carried in a second DHCP OFFER message sent by the second router to the terminal.

7. A data service implementation apparatus, wherein the apparatus is implemented in a communications system, wherein the communications system comprises a terminal, a first router, and a second router, wherein the first router is connected to the second router in a wireless or wired manner, and wherein the first router establishes a connection to Internet; and wherein the apparatus comprises:

at least one processor; and a memory storing instructions executable by the at least one processor, wherein the instructions, when executed by the at least one processor, instruct the at least one processor to:

establish a wireless local area network connection to the second router;

broadcast, according to a short-range communication protocol, a Dynamic Host Configuration Protocol discover (DHCP DISCOVER) message that carries identification information of the terminal;

receive a second Dynamic Host Configuration Protocol offer (DHCP OFFER) message, wherein the second DHCP OFFER message comprises a second Internet Protocol (IP) address and a second gateway address that are allocated by the second router to the terminal, and wherein the second DHCP OFFER message is a message sent to the terminal in response to the DHCP DISCOVER message received by the second router;

store the received second DHCP OFFER message;

receive a first DHCP OFFER message, wherein the first DHCP OFFER message comprises a first IP address and a first gateway address that are allocated by the first router to the terminal, and wherein the first DHCP OFFER message is a message sent to the terminal in response to the DHCP DISCOVER message received by the first router; and store the received first DHCP OFFER message in a storage of the apparatus where the received second DHCP OFFER message is stored;

determine whether the terminal stores a gateway record comprising a gateway that can implement a data service;

in response to determining that the terminal stores the gateway record comprising the gateway that can implement the data service, determine whether the second router is the same as the gateway recorded in the gateway record;

when determining that the second router is the same as the gateway stored in the gateway record, detect whether a domain name system (DNS) failure or a Transmission Control Protocol (TCP) receive (Rx) failure occurs;

send an Hypertext Transfer Protocol (HTTP) GET message to the second router when detecting the DNS failure or the TCP Rx failure, or when determining that the second router is different from the gateway stored in the gateway record;

determine whether a feedback message sent by the second router is received, wherein the feedback message is a message sent by the second router to the terminal in response to the HTTP GET message sent by the terminal; and when determining that the feedback message sent by the second router is not received, perform network configuration by using a first network configuration parameter carried in the first DHCP OFFER message, wherein the network configuration is performed to implement a data service by using the first router.

8. A data service implementation apparatus, wherein the apparatus is implemented in a communications system, wherein the communications system comprises a terminal, a first router, and a second router, wherein the first router is connected to the second router in a wireless or wired manner, and wherein the first router establishes a connection to Internet; and wherein the apparatus comprises:

at least one processor; and a memory storing instructions executable by the at least one processor, wherein the instructions, when executed by the at least one processor, instruct the at least one processor to:

establish a wireless local area network connection to the second router;

broadcast, according to a short-range communication protocol, request information for obtaining a network configuration parameter;

receive a first network configuration parameter sent by the first router;

store the received first network configuration parameter;

receive a second network configuration parameter sent by the second router;

store the received second network configuration parameter in a storage of the apparatus where the first network configuration parameter is stored;

determine whether the terminal stores a gateway record comprising a gateway that can implement a data service;

in response to determining that the terminal stores the gateway record comprising the gateway that can implement the data service, determine whether the first router is the same as the gateway recorded in the gateway record; and in response to determining that the first router is the same as the gateway recorded in the gateway record and that the terminal does not detect at least one of a domain name system (DNS) failure or a Transmission Control Protocol (TCP) receive (Rx) failure, performing, by the terminal, network configuration by using the first network configuration parameter; and send a second data service request to the second router, wherein the second data service request is used as follows: after receiving the second data service request, the second router forwards the second data service request to the first router based on a gateway address in the second data service request, and the first router sends the second data service request to a server through the Internet, wherein the second data service request is sent to implement a second data service of the terminal.

9. The apparatus according to claim 8, wherein the instructions further instruct the at least one processor to:

send an Hypertext Transfer Protocol (HTTP) GET message to the first router when the first router is the same as the gateway stored in the gateway record and the terminal detects the DNS failure or the TCP Rx failure.

10. The apparatus according to claim 8, wherein the instructions further instruct the at least one processor to:

send a HTTP GET message to the first router when the first router is different from the gateway stored in the gateway record.

11. The apparatus according to claim 9, wherein the instructions further instruct the at least one processor to:

when the terminal receives a feedback message sent by the first router in response to the HTTP GET message, perform network configuration by using the first network configuration parameter.

12. The apparatus according to claim 11, wherein the instructions further instruct the at least one processor to:

when the terminal does not receive the feedback message sent by the first router in response to the HTTP GET message, perform network configuration by using the second network configuration parameter.

13. The apparatus according to claim 8, wherein the first network configuration parameter comprises a first Internet Protocol (IP) address and a first gateway address that are carried in a first Dynamic Host Configuration Protocol (DHCP) OFFER message sent by the first router to the terminal; and wherein the second network configuration parameter comprises a second IP address and a second gateway address that are carried in a second DHCP OFFER message sent by the second router to the terminal.

* * * * *